US010393769B2

(12) United States Patent
Bernal et al.

(10) Patent No.: US 10,393,769 B2
(45) Date of Patent: Aug. 27, 2019

(54) MICROELECTROMECHANICAL DEVICE AND A METHOD OF DAMPING A MASS THEREOF

(71) Applicant: NXP USA, Inc., Austin, TX (US)

(72) Inventors: Olivier Bernal, Toulouse (FR); Lavinia Elena Ciotirca, Toulouse (FR); Thierry Dominique Yves Cassagnes, Tournefeuille (FR); Jerome Romain Enjalbert, Tournefeuille (FR); Helene Catherine Louise Tap, Toulouse (FR)

(73) Assignee: NXP USA, Inc., Austin, TX (US)

( * ) Notice: Subject to any disclaimer, the term of this patent is extended or adjusted under 35 U.S.C. 154(b) by 143 days.

(21) Appl. No.: 15/453,306

(22) Filed: Mar. 8, 2017

(65) Prior Publication Data

US 2017/0356928 A1 Dec. 14, 2017

(30) Foreign Application Priority Data

Jun. 10, 2016 (EP) .................................... 16305706

(51) Int. Cl.
*G01P 15/125* (2006.01)
*G01P 15/08* (2006.01)

(52) U.S. Cl.
CPC ............ *G01P 15/125* (2013.01); *G01P 15/08* (2013.01); *G01P 2015/0882* (2013.01)

(58) Field of Classification Search
CPC .. G01P 15/125; G01P 15/097; G01P 15/0802; G01P 15/18; G01P 1/003; G01C 19/5726; G01C 19/5705; G01C 19/5747
See application file for complete search history.

(56) References Cited

U.S. PATENT DOCUMENTS 6,841,992 B2 1/2005 Yue et al.
8,875,578 B2 11/2014 Smith
2005/0241394 A1* 11/2005 Clark ....................... B81B 5/00
73/504.12

(Continued)

OTHER PUBLICATIONS

M. Yucetas et al.: "A High-Resolution Accelerometer With Electrostatic Damping and Improved Supply Sensitivity", IEEE Journal of Solid-State Circuits, vol. 47, No. 7, Jul. 2012, pp. 1721-1730.

(Continued)

*Primary Examiner* — Helen C Kwok
(74) *Attorney, Agent, or Firm* — Charlene R. Jacobsen

(57) ABSTRACT

A microelectromechanical device comprising a mass, an electromechanical transducer configured to convert, after damping the mass during a first damping period, displacement of the mass in the first and second directions into corresponding first and second electrical signals during corresponding first and second conversion time periods, a derivative unit configured to generate first and second control signals indicative of the velocity of the mass in the first and second direction, and a controller for providing the first and second control signals to respective first and second one or more electrodes of the electromechanical transducer for simultaneously damping the mass in the first and second directions with a first and second damping forces corresponding to the first and second velocity during the damping time period.

16 Claims, 5 Drawing Sheets

(56) References Cited

U.S. PATENT DOCUMENTS

| | | | | |
|---|---|---|---|---|
| 2006/0266118 A1* | 11/2006 | Denison | ............ | G01C 19/5719 |
| | | | | 73/514.32 |
| 2008/0202237 A1* | 8/2008 | Hammerschmidt | ......................... | |
| | | | | G01C 19/5719 |
| | | | | 73/504.04 |
| 2011/0005315 A1* | 1/2011 | Chen | .................. | G01C 19/5726 |
| | | | | 73/504.12 |
| 2011/0120221 A1* | 5/2011 | Yoda | .................... | B81B 3/0086 |
| | | | | 73/514.32 |
| 2013/0104656 A1* | 5/2013 | Smith | .................. | G01P 15/125 |
| | | | | 73/514.32 |
| 2013/0152686 A1* | 6/2013 | Venkatraman | ........ | G01P 15/125 |
| | | | | 73/514.32 |
| 2014/0165724 A1* | 6/2014 | Krylov | .................. | G01P 15/097 |
| | | | | 73/514.15 |
| 2015/0377916 A1* | 12/2015 | Waters | ............... | G01C 19/5705 |
| | | | | 73/514.32 |

OTHER PUBLICATIONS

Honglin Xu et al.: "A Closed-Loop ΣΔ Interface for a High-Q Micromechanical Capacitive Accelerometer With 200 ng/√Hz Input Noise Density", IEEE Journal of Solid-State Circuits, vol. 50, No. 9, Sep. 2015, pp. 2101-2112.

* cited by examiner

MICROELECTROMECHANICAL DEVICE AND A METHOD OF DAMPING A MASS THEREOF

FIELD

This invention relates to a microelectromechanical device, a microelectromechanical accelerometer system and to a method of damping a mass of a microelectromechanical device.

BACKGROUND

Microelectromechanical systems (MEMS) devices are small devices used for example in accelerometers, gyroscopes, implemented in portable devices such as mobile phones, remote controllers, movement sensors or the like, where acceleration and/or velocity of the portable device can be measured. A MEMS device may include a mass suspended from a substrate and movable relative to the substrate, and an electromechanical transducer which converts external mechanical forces acting on the mass into measurable electrical signals. By measuring the electrical signals, the external mechanical forces acting on the mass, can be derived.

Mechanics of a MEMS accelerometer device can be modelled by a simple second order mass-spring system:

$$ma_{ext} = m\ddot{x} + b\dot{x} + kx \tag{1}$$

where,
m is the mass,
$a_{ext}$ is the external acceleration applied to the mass,
x is the mass displacement,
$\dot{x}$ is the mass velocity,
$\ddot{x}$ is the mass acceleration,
k is the spring constant, and
$b = 2D\sqrt{k*m}$ is the damping ratio.

In an un-damped MEMS accelerometer device, the mass may oscillate at a resonant frequency. In order to avoid undesired oscillations and thus prevent possible catastrophic effects on the mass and MEMS accelerometer device, the mass needs to be damped before measurement. By submerging the mass in viscous fluids, for example, friction of the mass can be controlled such that the mass is damped with damping ratio b in equation (1).

However, the amount of damping force applied is critical for the functionality of the MEMS accelerometer device. A MEMS accelerometer device described by equation (1) can have three different behaviours: if D>1 the device is overdamped, if 0<D<1, the device is underdamped, If D=1, the device is critically damped.

Overdamped MEMS accelerometer devices have a smaller settling time than underdamped MEMS accelerometer devices. Further, underdamped MEMS accelerometer devices can oscillate and eventually break.

As a consequence, overdamped MEMS accelerometer devices are preferred to underdamped MEMS accelerometer devices.

Critically damped MEMS accelerometer devices are ideally the best in class accelerometers because they can be damped very rapidly without oscillations.

Thus, there is a need for MEMS device which is more efficiently damped.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements, which correspond to elements already described, may have the same reference numerals.

DETAILED DESCRIPTION OF THE PREFERRED EMBODIMENTS

Figure 1:
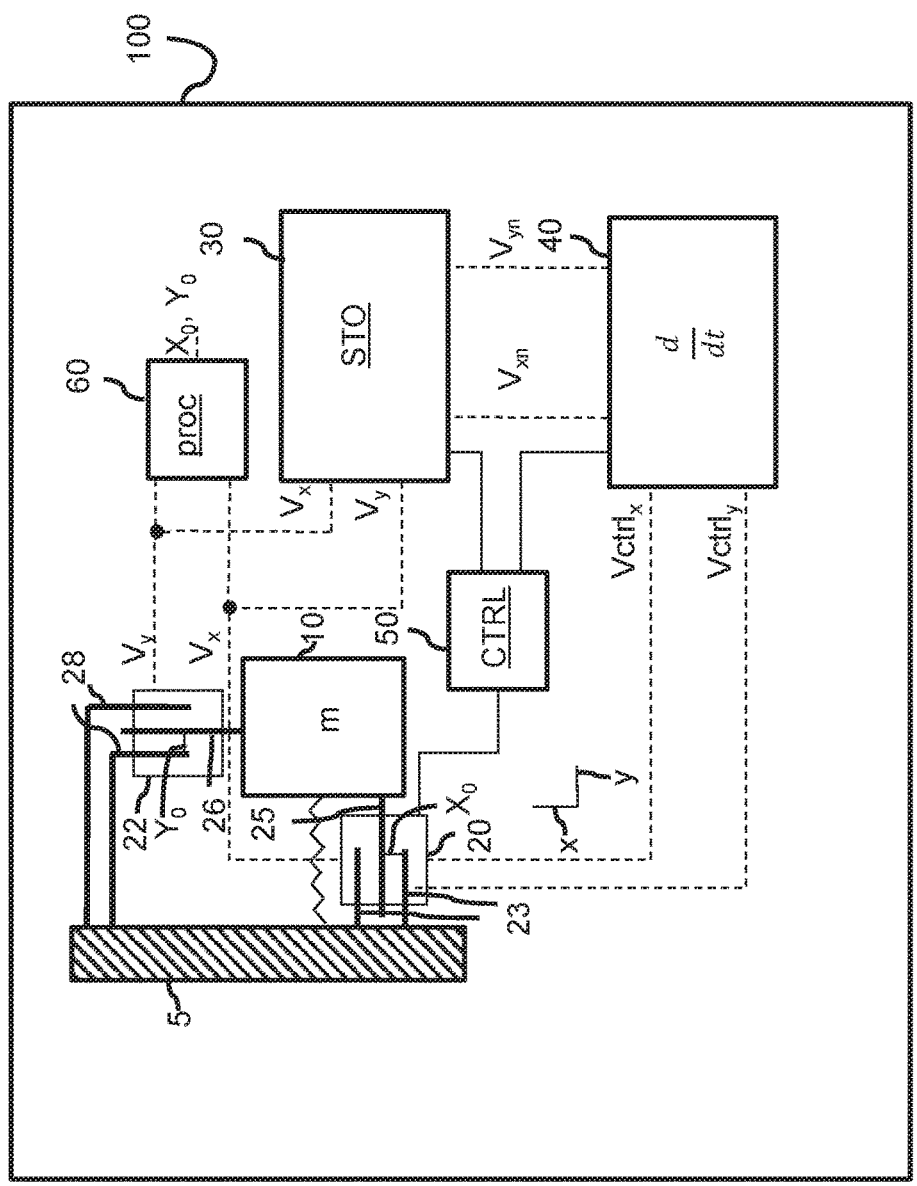
FIG. 1 schematically shows a first example of a microelectromechanical system device according to the invention, FIG. 2 schematically shows a second example of a microelectromechanical system device according to the invention, FIG. 3 schematically shows an example of time diagrams of the control signals used for the example shown in FIG. 2, FIG. 4 schematically shows an example of a derivative unit according to the invention.

An inventive microelectromechanical device is described which includes a mass suspended from a substrate and an electromechanical transducer for converting a first displacement of the mass in a first direction into a first electrical signal and a second displacement of the mass in a second direction into a second electrical signal. The first and second electrical signals can be processed in order to determine, for example, acceleration of the device. The mass is damped before a new conversion, so as to have each time a stable and accurate conversion of the displacement. The inventive microelectromechanical device provides simultaneous damping of the mass in the first direction and the second direction, during a damping time period. Simultaneous damping of the mass is performed by controlling the electromechanical transducer with a first control signal corresponding to the first derivative over time of the first electrical signal and a second control signal corresponding to the second derivative over time of the second electrical signal. The first control signal is related to the mass velocity in the first direction and the second control signal is related to the mass velocity in the second direction. The electromechanical transducer converts the first control signal and the second control signal to corresponding mechanical damping forces which physically damp the mass simultaneously in the first direction and second direction.

Damping of the mass has been applied more efficiently than in conventional microelectromechanical devices because damping has been applied simultaneously in the first direction and second direction during the damping time period. Before starting a new conversion in the first direction or second direction, settling time of the mass has been reduced, thereby the overall response time of the microelectromechanical device has been improved.

The inventive microelectromechanical device can be used as microelectromechanical systems (MEMS) accelerometer device for determining movement, velocity or acceleration of portable devices such as mobile phones, smartwatches, remote controllers, movement sensors or the like.

The inventive microelectromechanical device further includes storing means configured for storing samples of the first electrical signal and the second electrical signal, a derivative unit and a controller.

The electromechanical transducer is configured to convert the first displacement of the mass in the first direction during a first conversion time period.

The electromechanical transducer is configured to convert the second displacement of the mass in the second direction during a second conversion time period different from the first conversion time period.

Since the conversion of the displacement of the mass in the first and second directions is performed at different time periods, conversion in the respective first direction is performed independently from conversion in the second direction which means that conversion in each direction is more accurate.

The derivative unit is configured to generate the first control signal based on at least two successive stored samples of the first electrical signal.

The derivative unit is further configured to generate the second control signal based on at least two successive stored samples of the second electrical signal.

The controller is configured for controlling the electromechanical transducer, the storing means and the derivative unit for simultaneously providing the first control signal to one or more first electrodes of the electromechanical transducer and the second control signal to one or more second electrodes of the electromechanical transducer.

The same electrodes used for controlling damping of the mass in the first direction can be used for converting the displacement of the mass in the first direction. Similarly, the same electrodes used for controlling damping of the mass in the second direction can be used for converting the displacement of the mass in the second direction. In this way the transducer can be more compact and less complex than conventional transducers.

FIG. 1 schematically shows a first example of a microelectromechanical device 100. The microelectromechanical device 100 includes a mass 10 suspended from a substrate 5.

The microelectromechanical device 100 may be a microelectromechanical accelerometer system (MEMS) for determining acceleration of the mass 10 and for damping the mass 10 before acceleration is determined. Throughout the text reference is made to a microelectromechanical accelerometer system 100.

The mass 10 is movable relative to the substrate 5. For example, the mass 10 may be attached to the substrate 10 via one or more springs, flexible beams or any other elements made of an elastic material such that the mass 10 can freely move in all desired directions when an external mechanical force is applied to the microelectromechanical accelerometer system 100. The substrate 5 may be a structure of the microelectromechanical accelerometer system 100 which supports or encapsulates the microelectromechanical accelerometer system 100. Displacements of the mass 10 can therefore be measured in relation to such structure or frame. The microelectromechanical accelerometer system 100 may operate under vacuum, or the movable mass 10 be encapsulated in a cavity filled with a lubricant fluid, such that friction due to displacement of the mass 10, the one or more springs and/or elements made of elastic material can be at least controlled.

The microelectromechanical accelerometer system 100 further includes an electromechanical transducer 20, 22 having at least one or more electrodes for controlling damping of the mass in a first direction x and one or more electrodes for controlling damping of the mass in a second direction y.

The first direction x may be orthogonal to the second direction y as shown in FIG. 1. However, the first direction x may be not orthogonal to the second direction y but displaced relative to the second direction y by any angle, for example larger or smaller than 90 degrees.

The electromechanical transducer 20, 22 is configured to convert a first displacement of the mass in the first direction x to a first output electrical signal Vx during a first conversion time period and a second displacement of the mass in the second direction y, to a second output electrical signal Vy during a second conversion time period different from a first conversion time period.

The electromechanical transducer 20, 22 may be partly arranged on the mass 10 such that part of the electromechanical transducer 20, 22 is movable with the mass 10. The electromechanical transducer 20, 22 may be of any type suitable for the specific implementation.

The electromechanical transducer 20, 22 may be a capacitive, a piezo-electric, a piezo-resistive, or an optical transducer.

For example, as shown in FIG. 1, transducer 20 is a capacitive electromechanical transducer. The capacitive electromechanical transducer 20 can include at least a first pair of electrically conductive plates 23 arranged parallel to each other and fixed to the substrate 5 and a first electrically conductive plate arranged in parallel to the first pair, fixed to the mass 10 and movable with the mass 10 in the first direction x between the first pair of plates 23. The electrically conductive plates 23 may be excitation electrodes of the transducer 20 to which a bias voltage, for example a differential bias voltage can be applied.

In an embodiment, a variation in voltage corresponding to a variation of capacitance value between electrically conductive plates 23 and electrically conductive plate 25 can be measured via the electrically conductive plates 23.

The capacitive electromechanical transducer 20 can include (not shown in FIG. 1) other circuitry suitable to convert the variation in capacitance value between plates 23 and plate 25 due the displacement of the mass 10 in the first direction x.

Transducer 22 is also a capacitive electromechanical transducer. The capacitive electromechanical transducer 22 can include at least a second pair of electrically conductive plates 28 arranged parallel to each other and fixed to the substrate 5 and a second electrically conductive plate 26 arranged in parallel to the second pair, fixed to the mass 10 and movable with the mass 10 in the second direction y between the first pair of plates 28. The electrically conductive plates 28 may be excitation electrodes of the transducer 22 to which a bias voltage, for example a differential bias voltage can be applied.

In an embodiment, a variation in voltage corresponding to a variation of capacitance value between electrically conductive plates 28 and the second electrically conductive plate 26 can be measured via the electrically conductive plates 28.

The capacitive electromechanical transducer 22 can include (not shown in FIG. 1) other circuitry suitable to convert the variation in capacitance value between plates 28 and plate 26 due the displacement of the mass 10 in the second direction y.

Circuitry of transducer 20 and 22 can convert displacement $X_0$ of the plate 25 in the first direction x and displacement $Y_0$ of the plate 26 in the second direction y, into for example corresponding voltage values $V_x$ and $V_y$.

Microelectromechanical accelerometer system 100 can include a processor 60 for processing the first electrical signal Vx and second electrical signal Vy. The processor 60 is configured to receive, at a first processor input, the first electrical signal Vx from the one or more first electrodes (plates 23) for measuring the first displacement $X_0$ of the mass 10 in the first direction x. The processor 60 is configured to receive, at a second processor input, the second electrical signal Vy from the one or more second electrodes (plates 28) for measuring the second displacement $Y_0$ of the mass 10 in the second direction y.

Two different capacitive transducers 20 and 22 have been shown for measuring displacement of the mass 10 in the first direction x and second direction y, respectively. However, a single capacitive transducer can be used. For example, as shown, displacement of the mass in the first direction x can be measured by determining the capacitance change due to a change of a distance, e.g. $X_0$, of the movable electrically conductive plate relative to the fixed electrically conductive plates. Alternatively, displacement of the mass in the second direction y can be measured by determining the capacitance change due to a change of an overlapping area between the movable electrically conductive plate and each of the fixed electrically conductive plates.

The microelectromechanical accelerometer system 100 further includes storing means 30 configured for storing samples $V_{x1}$, $V_{x2}$, $V_{xn}$ and $V_{y1}$, $V_{y2}$, $V_{yn}$ of the first output electrical signal $V_x$ and the second electrical output signal $V_y$. The microelectromechanical accelerometer system 100 further includes a derivative unit 40 configured to generate a first control signal $Vctrl_x$ and a second control signal $Vctrl_y$.

The first control signal $Vctrl_x$ corresponds, for example is proportional, to the first derivative over time of the first electrical signal $V_x$ based on two successive stored samples of the first electrical signal $V_x$, for example $V_{x1}$ and $V_{x2}$. The first control signal $Vctrl_x$ is related to a first velocity of the mass 10 in the first direction x.

The second control signal $Vctrl_y$, corresponds, e.g. is proportional, to the first derivative over time of the second output electrical signal $V_y$ based on two successive stored samples of the second electrical signal $V_y$, for example $V_{y1}$ and $V_{y2}$. The second control signal $Vctrl_y$ is related to a second velocity of the mass 10 in the second direction y.

The microelectromechanical accelerometer system 100 further includes a controller 50. The controller 50 controls the microelectromechanical accelerometer system 100, and specifically transducers 20, 22, storing means 30 and derivative unit 40. Controlling may occur via time-controlled switches (not shown in FIG. 1) coupled to the transducers 20, 22, storing means 30 and derivative unit 40. The first control signal $Vctrl_x$ is provided to the plates 23 for controlling transducer 20. The second control signal $Vctrl_y$ is provided to the plates 28 for controlling transducer 22. The controller 50 ensures that the first control signal $Vctrl_x$ and the second control signal $Vctrl_y$ are provided at the same time to the respective plates 23 and 28. A first damping force corresponding to the first velocity is applied to the transducer 20 and a second damping force corresponding to the second velocity is applied to transducer 22.

The damping force can be of any nature depending on the specific implementation of the electromechanical transducer. For example, the damping force can be piezo-resistive if the electromechanical transducer is piezo-resistive, or piezo-electric if the electromechanical transducer is piezo-electric.

For capacitive transducers 20 and 22 such force is an electrostatic damping force.

If displacement of the mass 10 in the first direction x, $X_0$, is small compared to the distance d between electrically conductive plates 23 and 25, the first damping electrostatic force $\Delta F_{elec,x}$ acting between fixed plates 25 and movable plate 23 can be expressed by:

$$\Delta F_{elec,x} = \frac{1}{2}\varepsilon A\left[\frac{(V_{ctrlx} - V_{Bx})^2}{(d + X_0)^2} - \frac{(V_{ctrlx} + V_{Bx})^2}{(d - X_0)^2}\right] \cong -2\varepsilon A \frac{V_{Bx}}{d_0^2} V_{ctrlx} \quad (2)$$

if $X_0 << d$, where:
$\Delta F_{elec}$ is the net electrostatic damping force acting on the plates 25 and 23,
$\varepsilon$ the relative permittivity of the material inserted between the electrically conductive plates 25 and 23,
A is the total overlapping area between plates 23 and 25,
$V_{ctrlx}$ is the first control voltage,
$V_{Bx}$ is the bias voltage applied to plates 23,
d is the distance between plates 23 and plates 25,
$X_0$ is the displacement in the x direction of plate 25 relative to plates 23 and relative to a reference starting position (for example a position in the middle between plates 23).

At the same time an electrostatic damping force $\Delta F_{elec,y}$ is applied to transducer 22 acting between fixed plates 28 and movable plate 26.

By simultaneously applying the first damping force corresponding, e.g. proportional, to the first velocity of the mass 10 in the first direction x and the second damping force corresponding, e.g. proportional, to the second velocity of the mass 10 in the second direction, the mass 10 is damped more efficiently than in conventional accelerometer systems where, for example, damping of the mass in different directions is performed at different period of times. The settling time of the microelectromechanical accelerometer system 100 has been reduced before a new conversion is started, thereby the overall response time of the microelectromechanical accelerometer system 100 has been improved.

Further, since conversion of the first displacement of the mass 10 and second displacement of the mass 10 is performed at different conversion time periods, conversion of the displacement in the first direction x is not influenced by the conversion of the displacement of the mass in the second direction y. Conversions of the displacement of the mass 10 in a plurality of directions can be performed with better accuracy because it occurs during different conversion time periods, each assigned to a different direction.

In practical known MEMS accelerometer devices, before converting the displacement of the mass in the first direction x or in the second direction y, the mass 10 can be damped in the first direction x or in the second direction y but be still completely undamped, i.e. no damping force would be applied, either in the second direction y or first direction x, respectively. In known MEMS accelerometer devices, the mass can still freely oscillate without control in a direction different from the direction along which the mass has been damped because of, for example, parasitic movement effects. In the inventive microelectromechanical accelerometer system 100, this cannot occur or can occur to a much less extent.

The samples of the first control signal $V_x$ are stored in the storing means 30 after two successive conversions of the first displacement in the first direction x of the mass 10.

The samples of the second control signal $V_y$ are stored in the storing means 30 after two successive conversions of the second displacement in the second direction y of the mass 10.

Simultaneous damping in the first and second directions, x and y, occurs after at least two successive conversions of the first displacement in the first direction x and after two successive conversions of the second displacement in the second direction y. Since the samples are stored for each first direction and second direction sequentially in time, there is no need to use a complex electromechanical transducer which uses separate circuitry to convert the displacement of the mass 10 in the first direction x independently from the displacement of the mass in the second direction y.

Figure 2:
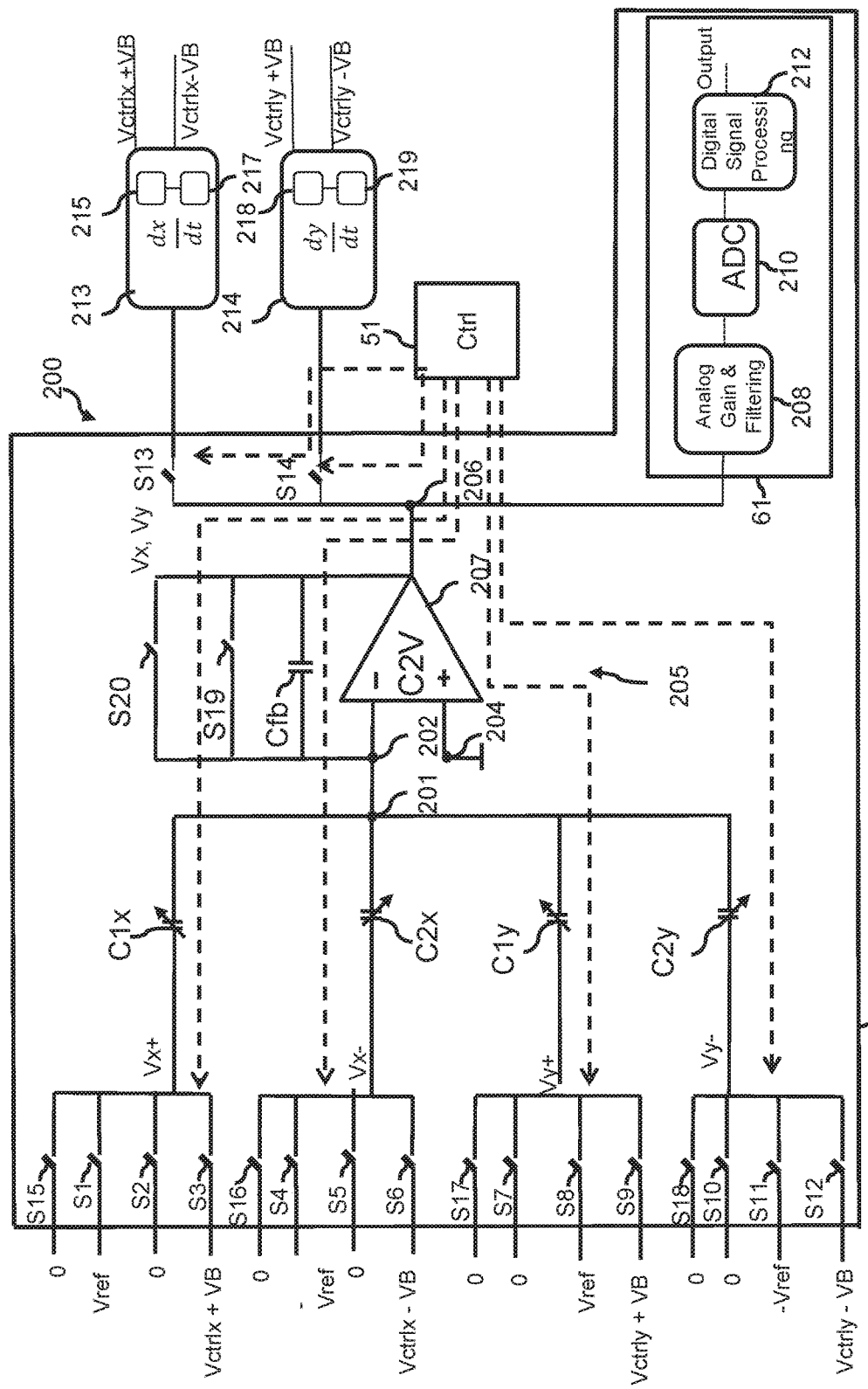
Figure 3:
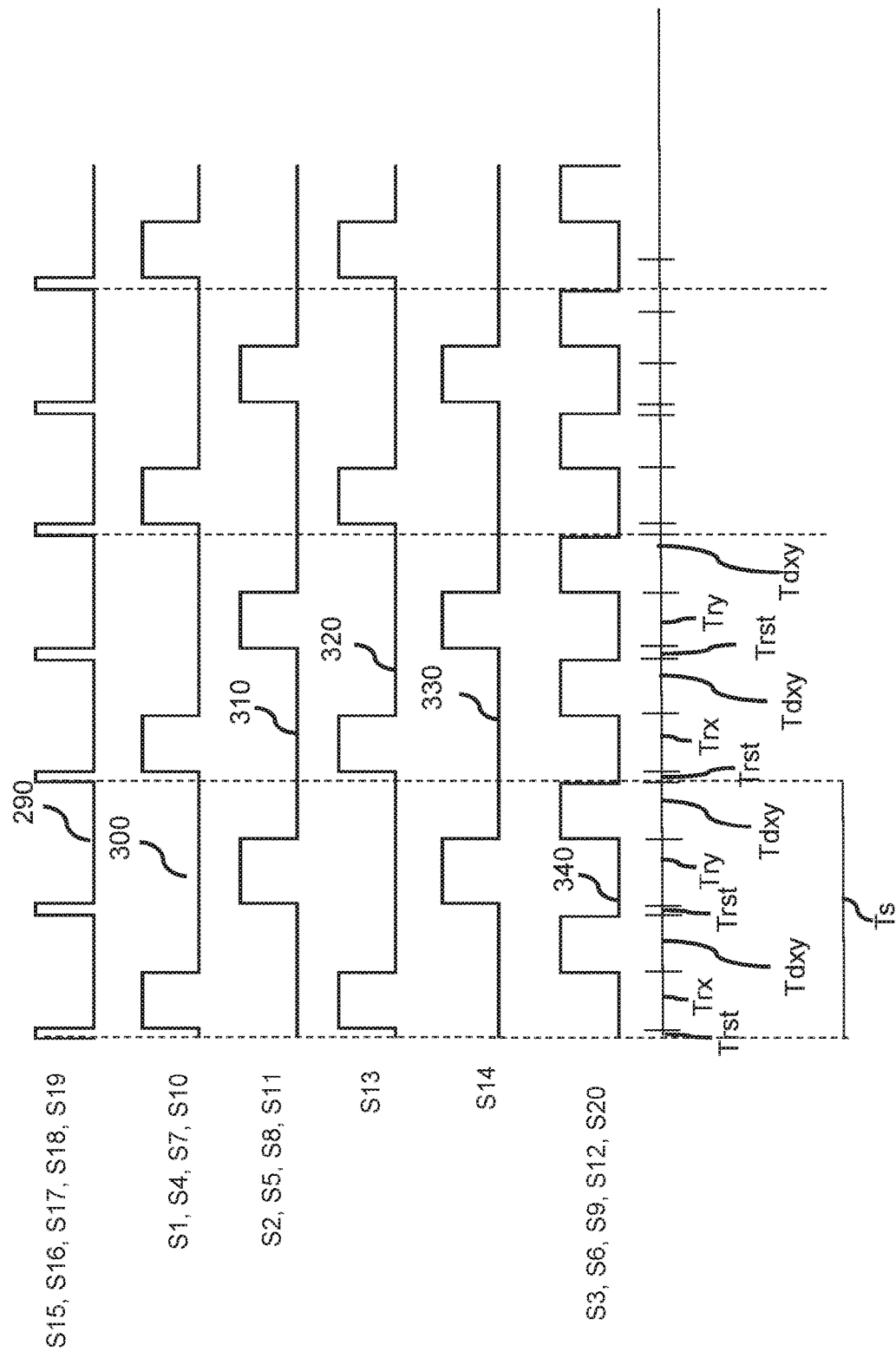

FIG. 2 schematically shows a second example of a microelectromechanical accelerometer system 200 according to the invention. FIG. 3 schematically shows an example of time diagrams of the control signals used for controlling switches S1 to S20, in the example shown in FIG. 2.

The microelectromechanical accelerometer system 200 includes a practical example of an inventive electromechanical transducer 21, a first derivative unit 213, a second derivative unit 214 and a processor 61.

The first derivative unit 213 can include a first memory 215 for storing the first derivative over time of the first electrical signal until the damping time period and a first voltage shifter 217 for offsetting the first control signal Vctrlx with a first offset voltage.

For example, the first voltage shifter 217 can offset the first control signal Vctrlx with a positive value of the first offset voltage VB and a negative value of the first offset voltage −VB.

The second derivative unit 214 can include a second memory 218 for storing the first derivative over time of the second electrical signal until the damping time period and a second voltage shifter 219 for offsetting the second control signal Vctrly with a second offset voltage.

For example, the second offset voltage can be equal to the first offset voltage. The second voltage shifter 219 can offset the second control signal Vctrly with a positive value VB of the second offset voltage and a negative value of the second offset voltage −VB.

The value of the offset voltage VB can be determined to optimize, e.g. maximize, the electrostatic damping force applied to the mass 10. For example, VB can be in the order of a few tenths of one Volt, for example in an embodiment 0.1 Volts, 0.2 Volts, in another embodiment 0.4 Volts.

The electromechanical transducer 21 includes a sampling circuit 205 for sampling the first output electrical signal Vx and second output electrical signal Vy.

The electromechanical transducer 21 includes variable capacitors C1x, C2x which represent the variable capacitance that is formed between fixed electrically conductive plates 23 of the transducer 20 (as shown in FIG. 1) and a first electrically conductive plate 25 anchored to the mass 10 and movable with the mass 10 in the first direction x. The one or more first electrodes are the electrically conductive plates 23.

The electromechanical transducer 21 further includes variable capacitors C1y, C2y which represent the variable capacitance that is formed between fixed electrically conductive plates 28 of the transducer 22 (as shown in FIG. 1) and a second electrically conductive plate 26 anchored to the mass 10 and movable with the mass 10 in the second direction y. The one or more second electrodes are the electrically conductive plates 28.

The sampling circuit 205 can include, for one of the first electrodes, three switches S1, S2 and S3 and for the other first electrode three switches S4, S5 and S6. Switches S1, S2, S3 are for electrically coupling, when the three switches S1, S2 and S3 are selectively switched on, one of the first electrodes to a positive terminal of a reference voltage source for generating a positive voltage reference Vref, or a reference potential, e.g. the ground, or the offset first control signal Vctrlx+VB. Switches S4, S5, and S6 are for electrically coupling, when the three switches S4, S5 and S6 are selectively switched on, the other one of the first electrodes to a negative terminal of the reference voltage source corresponding to a negative voltage reference −Vref, or the reference potential or the other offset first control signal Vctrlx−VB.

The sampling circuit 205 can include, for one of the second electrodes, three switches S7, S8 and S9, and, for the other first electrode, three switches S10, S11 and S12. Switches S7, S8, and S9 are for electrically coupling, when the three switches S7, S8 and S9 are selectively switched on, one of the second electrodes to the positive terminal of a reference voltage source for generating the positive voltage reference Vref, or the reference potential, or the offset second control signal Vctrly+VB. Switches S10, S11 and S12 are for electrically coupling, when the three switches S10, S11 and S12 are selectively switched on, the other one of the second electrodes to the negative terminal of the reference voltage source corresponding to the negative voltage reference −Vref, or the ground or the other offset second control signal Vctrly−VB.

When the transducer 21 is configured to convert the displacement of the mass 10 in the first direction x, the reference voltage source biases the plates 23 of capacitors Cx1 and Cx2 to Vref and to −Vref respectively, while the first electrically conductive plate 25 is biased to 0 Volts.

When the transducer 21 is configured to convert the displacement of the mass 10 in the second direction x, the reference voltage source biases the plates 28 of capacitors Cy1 and Cy2 to Vref and to −Vref respectively, while the second electrically conductive plate 26 is biased to 0 Volts.

The sampling circuit 205 can further include, associated to each electrically conductive plate 23, 28, further reset switches S15, S16, S17, S18, for electrically coupling, when the respective further switch is switched on, the respective electrically conductive plates 23, 28 to a reference potential, e.g. the ground for resetting the electromechanical transducer during a reset time period prior to each of the damping time period, the first conversion time period and the second conversion time period.

The sampling circuit 205 may include an amplifier 207, a feedback capacitor Cfb, sampling switches S13, S14, S19 and S20. S19 and S20 are reset switches which reset feedback capacitor Cfb during the reset time period by short circuiting both terminals of the feedback capacitor Cfb and connecting both terminals to virtual ground at the first amplifier input 202.

The amplifier 207 has a first amplifier input 202, a second amplifier input 204 and an amplifier output 206. The first amplifier input 202 is electrically coupled to the first electrically conductive plate 25 and the second electrically conductive plate 26, i.e. the plates movable with the mass 10. The amplifier output is electrically coupled via switch S13, when switch S13 is switched on, to an input of the first derivative unit 213 and via switch S14, when switch S14 is switched on, to an input of the second derivative unit 214.

The amplifier 207 may be any type of amplifier suitable for the specific implementation. The amplifier 207 may be a differential operational amplifier of which the first amplifier input 202 is an inverting input and the second amplifier input 204 is a non-inverting input. The amplifier 207 may be an operational transconductance amplifier, a current amplifier, a voltage amplifier, or a transimpedance amplifier.

The feedback capacitor Cfb may capacitively couple the first amplifier input 202 to the amplifier output 206.

The sampling circuit 205 is configured for sampling the first electrical signal or the second electrical signal depending on whether the displacement of the mass 10 is sensed in the first direction x or second direction y.

The processor 61 includes an analogue and gain and filtering block 208, an analogue to digital converter 210 (ADC) and a digital signal processing unit 212. At an output of the digital signal processing unit 212, the displacement of the mass 10 in the first direction x and second direction y can be measured.

The microelectromechanical accelerometer system 200 further includes a controller 51 configured for controlling the sampling switches S1 to S20.

The functionality of the sampling circuit 205 will be explained with reference to the time diagram of FIG. 3. The switches S15, S16, S17, S18, S19 are controlled with the same control signal 290 by controller 51. The switches S1, S4, S7 and S10 are controlled with the same control signal 300 by controller 51. Switches S2, S5, S8 and S11 can be controlled by the same control signal 310. Switch S13 can be controlled by controller 51 by control signal 320. Switch S14 can be controlled by controller 51 by control signal 330. Switches S3, S6, S9, S12 and S20 can be controlled by the same control signal 340. All control signals 290-350 can be time periodical with time period Ts.

The controller 51 is configured to control the electromechanical transducer 21 such that the first displacement of the mass 10 is converted into the first electrical signal Vx during a first conversion time period Trx. In the first conversion time period Trx, switches S1, S4, S7 and S10 are switched on together with switch S13 such that the electrically conductive plates of capacitors C1x, C2x are electrically coupled one to a positive terminal of the reference voltage source Vref and the other one to the negative terminal of the reference voltage source −Vref, while the first electrically conductive plate 25 and the electrically conductive plates of capacitors C1y and C2y are electrically coupled to a reference intermediate voltage, for example the ground (i.e. 0 Volts). During the first conversion time period Trx, displacement of the first electrically conductive plate 25 with respect to the biased plates 23 can be sensed by sensing the change in capacitance in the capacitors C1x and C2x. This change in capacitance is equivalent to a charge change accumulated in the capacitors C1x and C2x when a reference voltage Vref is applied to the fixed electrically conductive plates 23 of the capacitors C1x and C2x. This charge change is transferred from the capacitors C1x and C2x to the amplifier output 206 via the feedback capacitor Cfb such that a first voltage, proportional to the change in capacitance in the capacitors C1x and C2x, is generated at the amplifier output 206. The first voltage is applied to an input of the first derivative unit 213 via the switched on switch S13.

In a subsequent second conversion time period Try, the controller 51 is configured to control the electromechanical transducer 21 such that the second displacement of the mass 10 is converted into the second electrical signal Vy. In the second conversion time period Try, switches S1, S4, S7 and S10 are switched off while switches S2, S5, S8 and S11 are switched on together with switch S14 such that the electrically conductive plates of capacitors C1y, C2y are electrically coupled one to a positive terminal of the reference voltage source Vref and the other one to the negative terminal of the reference voltage source −Vref, while the second electrically conductive plate 26 and the electrically conductive plates of capacitors C1x and C2x are electrically coupled to a reference intermediate voltage, for example the ground (i.e. 0 Volts). During the second conversion time period Try, displacement of the second electrically conductive plate 26 with respect to the biased plates 28 can be sensed by sensing the change in capacitance in the capacitors C1y and C2y. This change in capacitance is equivalent to a charge change accumulated in the capacitors C1y and C2y when a reference voltage Vref is applied to the fixed electrically conductive plates 28 of the capacitors C1y and C2y. This charge change is transferred from the capacitors C1y and C2y to the amplifier output 206 via the feedback capacitor Cfb such that a second voltage, proportional to the change in capacitance in the capacitors C1y and C2y, is generated at the amplifier output 206. The second voltage is applied to an input of the second derivative unit 214 via the switched on switch S14.

Moreover, during the first conversion time period Trx, the first derivative unit 213 generates a first control signal corresponding to the first derivative over time of the first electrical signal based on the currently applied voltage at the input of derivative unit 213 and, for example, a previously measured voltage indicative of a displacement of the mass 20 in the first direction x, which corresponding charge is stored in the memory 215, until the damping time period Tdxy.

During the second conversion time period Try, the second derivative unit 214 generates a second control signal corresponding to the first derivative over time of the second electrical signal based on the currently applied voltage at the input derivative unit 214 and, for example, a previously measured voltage indicative of a displacement of the mass 22 in the second direction y, which corresponding charge is stored in the memory 218, until the damping time period Tdxy.

After the first conversion time period Trx and the second conversion time period Try, the controller 51 controls the microelectromechanical accelerometer system 200 for switching off the switch S14 with control signal 330 and switching on switches S3, S6, S9, S12, and S20 with control signal 340 during a damping time period Tdxy.

During the damping time period Tdxy, the controller 51 is further configured to switch off the switches S2, S5, S8 and S11.

After each conversion time period Trx and Try, a damping time period Tdxy may follows, in which the mass 10 is damped simultaneously in the first direction x and second direction y. Control signals 290-340 may be applied cyclically in time with cycle time Ts. Thus simultaneous damping in the first direction x and in the second direction y during the time period Txyd can be applied cyclically to the mass 10 with cycle time Ts.

By applying control signals 300-350 cyclically in time with cycle time Ts, damping in the first direction x and damping in the second direction y is applied twice during the cycle time Ts, particularly during two subsequent damping time periods Tdxy. As a consequence, the net electrostatic damping force applied to the mass 10 in the first direction x and in the second direction y is twice the electrostatic damping force applied during a damping time period Tdxy. This allows to apply a more efficient damping to the mass 10 during the cycle time Ts when the displacement of the mass 10 along the first direction x and the second direction y is converted into corresponding electrical signals Vx and Vy.

The embodiments of FIG. 1 and FIG. 2 have been described with reference to simultaneously damping the mass 10 in two different directions x and y. However, the mass 10 can be simultaneously damped in more than two directions, for example three or more directions.

In an embodiment (not shown in the Figures), the electromechanical transducer can have one or more third electrodes for controlling damping of the mass in a third direction. The electromechanical transducer can be configured to convert a third displacement of the mass in the third direction to a third electrical signal during a third conversion time period. The storing means may be configured to store samples of the third electrical signal. The derivative unit may be configured to generate a third control signal corresponding, e.g. proportional, to the first derivative over time of the third electrical signal based on at least two successive stored samples of the third electrical signal indicative of a velocity of the mass in the third direction.

For example, the derivative unit may include a third derivative unit similar to derivative units 213 and 214 described with reference to FIG. 2, including a memory for storing samples of the third electrical signal and/or of the first derivative of the third electrical signal, and a voltage shifter for offsetting the third control signal by a positive value of a first offset voltage VB and a negative value of the first offset voltage −VB. The offset third control signals can be applied to the third electrodes to damp the mass 10 in the third direction.

The controller 51 can thus be configured for controlling the electromechanical transducer, the storing means and the derivative unit for providing the third control signal to the one or more third electrodes for simultaneously damping the mass in the third direction with a third damping force corresponding, e.g. proportional, to the third velocity during the damping time period.

Figure 4:
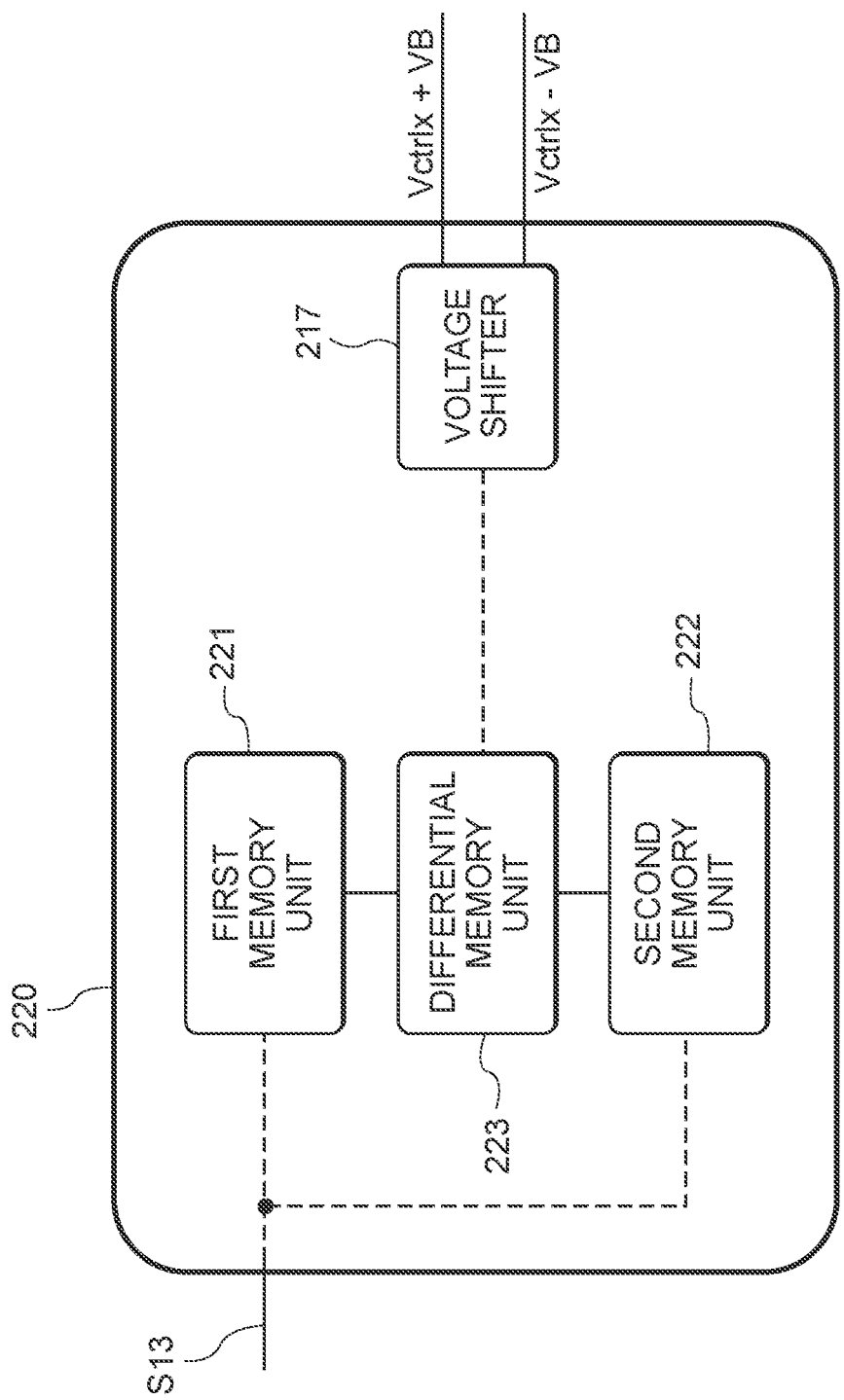

FIG. 4 schematically shows a non-limitative example of a derivative unit 220. The example relates to an implementation of a first derivative unit, for example derivative unit 213 shown in FIG. 2. Second derivative units 214 can be implemented in the same manner.

Derivative unit 220 includes a first memory unit 221 coupled to an input of the derivative unit 220 which is electrically coupled to the amplifier output 206 of the sampling circuit 205 via respective switch S13 for providing the offset first electrical control signal $Vctrl_x+VB$ and $Vctrl_x-VB$. The first memory unit 221 is configured to store a current sample of the first electrical signal Vx.

Derivative unit 220 includes a second memory unit 222 configured to have stored one previous sample of the first electrical signal Vx in a previous first conversion time period Trx.

Derivative unit 220 further includes a differential memory unit 223 configured to store a sample difference between the current sample and the previous sample of the first electrical signal Vx.

The controller (not shown in FIG. 4) is configured to control the first memory unit 221 to store, during the first conversion time period Trx, the current sample of the first electrical signal Vx until a subsequent first conversion time period Trx. The controller may be configured to control the first memory unit 221 such that, after the first conversion time period Trx, the currently stored sample of the first electrical signal Vx is transferred to the second memory unit 222 and stored therein until the subsequent first conversion time period Trx. The controller (not shown in FIG. 4) is configured to control the differential memory unit 223 to store the sample difference until the damping time period Tdxy. The sample difference is then offset with voltage values VB and −VB by voltage shifter 217 which provides control voltages Vctrlx+VB and Vctrlx−VB to the electrically conductive plates of capacitors C1x and C2x during the damping time period Tdxy for damping the mass in the first direction x.

Memory units 221, 222 and 223 may be implemented in any manner suitable for the specific implementation, for example with switchable capacitors, digital memories or the like.

Figure 5:
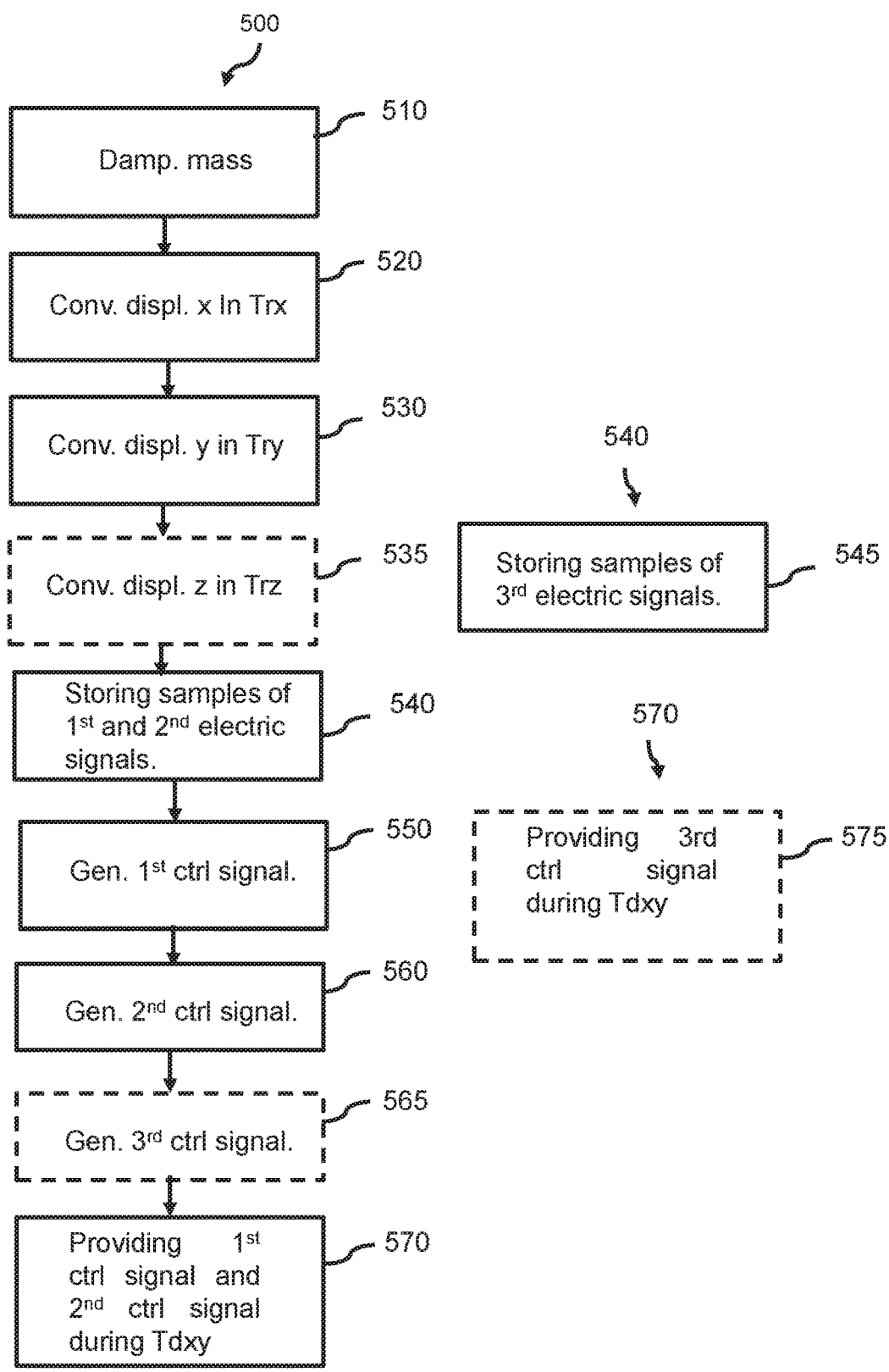
FIG. 5 shows a flow diagram of a method of damping a mass of an electromechanical system device.

FIG. 5 shows a flow diagram of a method of damping a mass of an electromechanical system device. The method can be performed with the microelectromechanical system device 100 or 400 described with reference to FIGS. 1 to 4.

The method includes the damping 510 the mass during a damping time period, converting 520 a first displacement of the mass 10 in a first direction x, to a first electrical signal during a first conversion time period Trx, converting 530 a second displacement of the mass 10 in a second direction y, to a second electrical signal during a second conversion time period Try different from the first conversion time period.

Further the method includes storing 540 samples of the first electrical signal and the second electrical signal, generating 550 a first control signal corresponding, e.g. proportional, to the first derivative over time of the first electrical signal based on at least two successive stored samples of the first electrical signal and indicative of a first velocity of the mass in the first direction, generating 560 a second control signal corresponding, e.g. proportional, to the first derivative over time of the second electrical signal based on at least two successive stored samples of the second electrical signal indicative of a velocity of the mass in the second direction.

The method includes providing 570 the first control signal to one or more first electrodes of the electromechanical transducer and the second control signal to one or more second electrodes of the electromechanical transducer for simultaneously damping the mass in the first direction with a first damping force corresponding, e.g. proportional, to the first velocity and in the second direction with a second damping force corresponding, e.g. proportional, to the second velocity during the damping time period Tdxy. Simultaneous damping of the mass occurs during the damping time period after the first conversion time period Trx and the second conversion time period Try and after storing the successive samples of the first electrical signal and second electrical signal.

The method can be extended to simultaneously damping the mass in more than two directions. For example, the electromechanical transducer may have one or more third electrodes for controlling damping of the third mass in a third direction z. The method may further include converting 535 a third displacement of the mass 10 in a third direction z, to a third electrical signal during a third conversion time period Trz different from the first conversion time period Trx and second conversion time period Try and generating 565 a third control signal corresponding, e.g. proportional, to the first derivative over time of the third electrical signal based on at least two successive stored samples of the third electrical signal and indicative of a third velocity of the mass in the third direction z.

Storing 540 may further include storing 545 samples of the third electrical signal.

Providing 570 may further include providing 575 the third control signal to the one or more third electrodes for damping the mass in the third direction with a third damping force corresponding, e.g. proportional, to the third velocity during the damping time period Tdxy.

It is to be understood that the architectures depicted herein are merely exemplary, and that in fact many other architectures can be implemented which achieve the same functionality.

In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably electrically coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A microelectromechanical device comprising:
   a mass suspended from a substrate and movable relative to the substrate;
   an electromechanical transducer configured to convert a first displacement of the mass in a first direction to a first electrical signal during a first conversion time period, and to convert a second displacement of the mass in a second direction to a second electrical signal during a second conversion time period different from the first conversion time period, wherein the second direction is angularly displaced from the first direction by an angle greater than 0 degrees and less than 180 degrees;
   storing means configured for storing samples of the first electrical signal and the second electrical signal;
   a derivative unit configured to
      generate a first control signal corresponding to a first derivative over time of the first electrical signal based on at least two successive stored samples of the first electrical signal, wherein the first control signal is related to a first velocity of the mass in the first direction, and
      generate a second control signal corresponding to a first derivative over time of the second electrical signal based on at least two successive stored samples of the second electrical signal, wherein the second control signal is related to a second velocity of the mass in the second direction; and
   a controller for controlling the electromechanical transducer, the storing means, and the derivative unit for providing the first control signal to one or more first electrodes of the electromechanical transducer and the second control signal to one or more second electrodes of the electromechanical transducer, for simultaneously damping the mass in the first direction with a first damping force corresponding to the first velocity and in the second direction with a second damping force corresponding to the second velocity during a damping time period, wherein:
   the electromechanical transducer comprises:
      one or more third electrodes for controlling damping of the mass in a third direction, wherein the electromechanical transducer is configured to convert a third displacement of the mass in the third direction to a third electrical signal during a third conversion time period, wherein:
         the storing means is configured to store samples of the third electrical signal,
         the derivative unit is configured to generate a third control signal corresponding to a first derivative over time of the third electrical signal based on at least two successive stored samples of the third electrical signal, wherein the third control signal is related to a third velocity of the mass in the third direction, and
         the controller is configured to control the electromechanical transducer, the storing means, and the derivative unit for providing the third control signal to the one or more third electrodes for simultaneously damping the mass in the third direction with a third damping force corresponding to the third velocity during the damping time period.

2. A microelectromechanical device according to claim 1, comprising a processor for processing the first electrical signal and the second electrical signal, wherein the processor is configured to
   receive the first electrical signal from the one or more first electrodes for converting the first displacement of the mass in the first direction, and
   receive the second electrical signal from the one or more second electrodes for converting the second displacement of the mass in the second direction.

3. A microelectromechanical device according to claim 1, wherein the storing means is configured to store the successive samples of the second control signal and the first control signal until the damping time period.

4. A microelectromechanical device according to claim 1, wherein
the controller is configured to control the electromechanical transducer, the storing means and the derivative unit for simultaneously damping the mass in the first direction and in the second direction during a further damping time period between the first conversion time period and the second conversion time period.

5. A microelectromechanical device according to claim 4, wherein
the controller is configured to control the electromechanical transducer, the storing means and the derivative unit such that the first conversion time period, the further damping time period, the second conversion time period, and the damping time period occur cyclically in this order with a predetermined cycle time.

6. A microelectromechanical device according to claim 1, wherein
the derivative unit comprises a voltage shifter for offsetting the first control signal with a first offset voltage and the second control signal with a second offset voltage for optimizing the damping.

7. A microelectromechanical device according to claim 1, wherein the electromechanical transducer is a capacitive transducer and comprises:
a first pair of electrically conductive plates arranged parallel to each other and fixed to the substrate;
a first electrically conductive plate arranged in parallel to the first pair of electrically conductive plates, fixed to the mass and movable with the mass between the first pair of electrically conductive plates in the first direction;
a second pair of electrically conductive plates arranged parallel to each other and fixed to the substrate; and
a second electrically conductive plate arranged in parallel to the second pair of electrically conductive plates, fixed to the mass and movable with the mass between the second pair of electrically conductive plates in the second direction, wherein
the one or more first electrodes are the first pair of electrically conductive plates and the one or more second electrodes are the second pair of electrically conductive plates.

8. A microelectromechanical device according to claim 7, wherein the first electrically conductive plate and the second electrically conductive plate are electrically coupled to a reference potential during the first conversion time period, the second conversion time period, and the damping time period.

9. A microelectromechanical device comprising:
a mass suspended from a substrate and movable relative to the substrate;
an electromechanical transducer configured to convert a first displacement of the mass in a first direction, to a first electrical signal during a first conversion time period, and a second displacement of the mass in a second direction, to a second electrical signal during a second conversion time period different from the first conversion time period, wherein the second direction is angularly displaced from the first direction by an angle greater than 0 degrees and less than 180 degrees, and wherein the electromechanical transducer is a capacitive transducer comprising:
a first pair of electrically conductive plates arranged parallel to each other and fixed to the substrate;
a first electrically conductive plate arranged in parallel to the first pair of electrically conductive plates, fixed to the mass and movable with the mass between the first pair of electrically conductive plates in the first direction;
a second pair of electrically conductive plates arranged parallel to each other and fixed to the substrate; and
a second electrically conductive plate arranged in parallel to the second pair of electrically conductive plates, fixed to the mass and movable with the mass between the second pair of electrically conductive plates in the second direction;
storing means configured for storing samples of the first electrical signal and the second electrical signal;
a derivative unit configured to
generate a first control signal corresponding to a first derivative over time of the first electrical signal based on at least two successive stored samples of the first electrical signal, wherein the first control signal is related to a first velocity of the mass in the first direction, and
generate a second control signal corresponding to a first derivative over time of the second electrical signal based on at least two successive stored samples of the second electrical signal, wherein the second control signal is related to a second velocity of the mass in the second direction;
a controller for controlling the electromechanical transducer, the storing means and the derivative unit for providing the first control signal to the first pair of electrically conductive plates of the capacitive transducer, and the second control signal to the second pair of the electrically conductive plates of the capacitive sensor, for simultaneously damping the mass in the first direction with a first damping force corresponding to the first velocity and in the second direction with a second damping force corresponding to the second velocity during a damping time period, wherein the first electrically conductive plate and the second electrically conductive plate are electrically coupled to a reference potential during the first conversion time period, the second conversion time period, and the damping time period, and
a sampling circuit for sampling the first electrical signal and the second electrical signal, the sampling circuit comprising:
three switches associated to each electrically conductive plate of the first pair of electrically conductive plates and the second pair of electrically conductive plates, for electrically coupling, when the three switches are selectively switched on,
one electrically conductive plate of the first pair to either a positive terminal of a reference voltage source for generating a positive voltage reference or the reference potential, or the first control signal,
the other electrically conductive plate of the first pair to either a negative terminal of the reference voltage source, or the reference potential, or the first control signal, and
one electrically conductive plate of the second pair to either the positive terminal of the reference voltage source, or the reference potential, or the second control signal, the other electrically conductive plate of the second pair to either the negative terminal of the reference voltage source, or the reference potential, or the second control signal.

10. A microelectromechanical device according to claim 9, wherein the sampling circuit further comprises:
a further switch associated to each electrically conductive plate of the first pair and the second pair, for electrically coupling, when the further switch is switched on, each electrically conductive plate of the first pair and the second pair to the reference potential, for resetting the electromechanical transducer during a reset time period prior to each of the damping time period, the first conversion time period and the second conversion time period.

11. A microelectromechanical device according to claim 10, wherein the controller is configured to control the three switches such that,
during the first conversion time period, one electrically conductive plate of the first pair is electrically coupled to the positive terminal of the reference voltage source and the other electrically conductive plate of the first pair is electrically coupled to the negative terminal of the reference voltage source, while the electrically conductive plates of the second pair are electrically coupled to the reference potential, and
during the second conversion time period, one electrically conductive plate of the second pair is electrically coupled to the positive terminal of the reference voltage source and the other electrically conductive plate of the second pair is electrically coupled to the negative terminal of the reference voltage source while the electrically conductive plates of the first pair are electrically coupled to the reference potential.

12. A microelectromechanical device according to claim 11, wherein the derivative unit comprises:
a first derivative unit for generating the first control signal offset with a positive value of a first offset voltage and the first control signal offset with a negative value of the first offset voltage;
a second derivative unit for generating the second control signal offset with a positive value of a first offset voltage and the second control signal offset with a negative value of the first offset voltage, wherein
the sampling circuit comprises an amplifier having a first amplifier input, a second amplifier input and an amplifier output,
the first amplifier input is electrically coupled to the first electrically conductive plate and the second electrically conductive plate, and
the amplifier output is electrically coupled via a first switch, when the first switch is switched on, to an input of the first derivative unit, and via a second switch, when the second switch is switched on, to an input of the second derivative unit.

13. A microelectromechanical device according to claims 12, wherein, during the damping time period, the controller is configured to control the three switches associated with the electrically conductive plates of the first pair and the second pair such that
one of the electrically conductive plates of the first pair is electrically coupled to the first control signal offset with the positive value of the first offset voltage and the other electrically conductive plate of the first pair is electrically coupled to the first control signal offset with the negative value of the first offset voltage, and
one of the electrically conductive plates of the second pair is electrically coupled to the second control signal offset with the positive value of the second offset voltage and the other electrically conductive plate of the second pair is electrically coupled to the second control signal offset with the negative value of the second offset voltage.

14. A microelectromechanical device according to claim 13, wherein the controller is configured to
switch on the first switch and switch off the second switch during the first conversion time period;
switch off the first switch and switch on the second switch during the second conversion time period; and
switch off the first switch and the second switch during the damping time period.

15. A microelectromechanical device according to claim 14, wherein the first derivative unit and the second derivative unit comprise:
respective first memory units coupled to the respective inputs of the first and second derivative units and configured to store a current sample of respective first and second electrical signals;
respective second memory units configured to have stored one previous sample of respective first electrical signal and second electrical signal; and
respective differential memory units configured to store a sample difference between the current sample and the previous sample; wherein
the controller is configured to control the respective first memory units to store, during the respective first conversion time period and second conversion time period, the current sample of respective first electrical signal and second electrical signal until a subsequent respective first conversion time period and second conversion time period, and the differential memory units to store the sample difference until the damping time period.

16. A method of damping a mass of a microelectromechanical device, the microelectromechanical device comprising an electromechanical transducer, the method comprising:
damping the mass during a damping time period;
converting a first displacement of the mass in a first direction, to a first electrical signal during a first conversion time period;
converting a second displacement of the mass in a second direction, to a second electrical signal during a second conversion time period different from the first conversion time period;
after converting the second displacement of the mass in the second direction, converting a third displacement of the mass in a third direction, to a third electrical signal during a third conversion time period different from the first conversion time period and the second conversion time period;
storing samples of the first electrical signal and the second electrical signal, wherein the second direction is angularly displaced from the first direction by an angle greater than 0 degrees and less than 180 degrees;
generating a first control signal corresponding to a first derivative over time of the first electrical signal based on at least two successive stored samples of the first electrical signal, wherein the first control signal is related to a first velocity of the mass in the first direction;
generating a second control signal corresponding to first derivative over time of the second electrical signal based on at least two successive stored samples of the second electrical signal, wherein the second control signal is related to a second velocity of the mass in the second direction after generating the second control signal, generating a third control signal corresponding to a first derivative over time of the third electrical signal based on at least two successive stored samples of the third electrical signal, wherein the third electrical signal is related to a third velocity of the mass in the third direction; and providing the first control signal to one or more first electrodes of the electromechanical transducer for controlling damping of the mass in the first direction, providing the second control signal to one or more second electrodes of the electromechanical transducer for controlling damping of the mass in the second direction, and providing the third control signal to one or more third electrodes of the electromechanical transducer for controlling damping of the mass in the third direction, for simultaneously damping the mass in the first direction with a first damping force corresponding to the first velocity, the second direction with a second damping force corresponding to the second velocity, and the third direction with a third damping force corresponding to the third velocity during the damping time period.

* * * * *